United States Patent
Luo et al.

(10) Patent No.: US 9,887,646 B2
(45) Date of Patent: Feb. 6, 2018

(54) METHOD FOR CHECKING OUT-OF-STEP OF SYNCHRONOUS MOTOR

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Hui Luo, Guangdong (CN); Zhiyong Du, Guangdong (CN); Xuguang Zhou, Guangdong (CN); Xinxin Zhang, Guangdong (CN); Xing Chen, Guangdong (CN); Kai Xiao, Guangdong (CN); Lipin Cheng, Guangdong (CN)

(73) Assignees: SHENZHEN BYD AUTO R&D COMPANY LIMITED, Shenzhen, Guangdong (CN); BYD COMPANY LIMITED, Shenzhen, Guangdong (CN)

(*) Notice: Subject to any disclaimer, the term of this patent is extended or adjusted under 35 U.S.C. 154(b) by 86 days.

(21) Appl. No.: 14/039,852

(22) Filed: Sep. 27, 2013

(65) Prior Publication Data
US 2014/0084825 A1    Mar. 27, 2014

(30) Foreign Application Priority Data
Sep. 27, 2012 (CN) .......................... 2012 1 0367126

(51) Int. Cl.
H02H 7/08 (2006.01)
H02P 21/00 (2016.01)
(Continued)

(52) U.S. Cl.
CPC ............... *H02P 6/001* (2013.01); *H02P 6/12* (2013.01); *H02P 6/182* (2013.01); *H02P 6/34* (2016.02)

(58) Field of Classification Search
CPC .... H02P 6/14; H02P 6/001; H02P 6/12; H02P 6/22
(Continued)

(56) References Cited

U.S. PATENT DOCUMENTS 4,376,295 A    3/1983   Uenosono et al.
4,916,368 A *  4/1990   Onoda .................... H02P 25/03
                                                318/723
(Continued)

FOREIGN PATENT DOCUMENTS

CN    1437314 A      8/2003
CN    101149423 A    3/2008
(Continued)

OTHER PUBLICATIONS

KR 10-2012-0028087 English Machine Translation Kwon et al.*
(Continued)

*Primary Examiner* — Eduardo Colon Santana
*Assistant Examiner* — Gabriel Agared
(74) *Attorney, Agent, or Firm* — Finnegan, Henderson, Farabow, Garrett & Dunner LLP (57) ABSTRACT

A method for checking an out-of-step of a synchronous motor includes detecting electric degrees of the synchronous motor, in which the electric degrees comprise at least a first electric degree and a second electric degree detected at a preset interval, and the second electric degree is detected after the first electric degree; comparing the first electric degree with the second electric degree to obtain a comparing result; and determining that the synchronous motor is out of step when the comparing result satisfies a preset requirement. It is determined that the synchronous motor is out of step when the electric degree keeps unchanged or decreases progressively, or an increment of the electric degree is very small.

16 Claims, 5 Drawing Sheets

(51) Int. Cl.
 *H02P 6/00* (2016.01)
 *H02P 6/12* (2006.01)
 *H02P 6/182* (2016.01)
 *H02P 6/34* (2016.01)

(58) Field of Classification Search
 USPC .................................. 318/400.02, 400.21
 See application file for complete search history.

(56) References Cited

U.S. PATENT DOCUMENTS

| | | | | |
|---|---|---|---|---|
| 5,625,277 | A * | 4/1997 | Khan | H02J 3/1807 307/102 |
| 5,969,496 | A * | 10/1999 | Yamada | H02P 1/52 318/254.1 |
| 6,362,586 | B1 | 3/2002 | Naidu | |
| 6,396,229 | B1 * | 5/2002 | Sakamoto | H02P 6/18 318/400.02 |
| 2003/0071588 | A1 | 4/2003 | Iwaji et al. | |
| 2004/0113581 | A1 * | 6/2004 | Kobayashi | G05B 19/40 318/685 |
| 2004/0249596 | A1 * | 12/2004 | Ho | H02P 6/085 702/106 |
| 2006/0125439 | A1 * | 6/2006 | Ajima | B60K 6/26 318/716 |
| 2007/0069681 | A1 | 3/2007 | Imura et al. | |
| 2009/0140688 | A1 * | 6/2009 | Iura | H02P 6/12 318/706 |
| 2011/0127937 | A1 * | 6/2011 | Takamatsu | H02P 25/024 318/400.06 |
| 2011/0156624 | A1 * | 6/2011 | Takai | H02P 6/182 318/400.04 |
| 2011/0219816 | A1 * | 9/2011 | Tanaka | H02P 6/18 62/498 |
| 2012/0014227 | A1 | 1/2012 | Honmura et al. | |
| 2012/0211299 | A1 | 8/2012 | Yanai | |
| 2013/0147405 | A1 * | 6/2013 | Yoon | B60L 11/14 318/400.3 |
| 2013/0249450 | A1 * | 9/2013 | Kwon et al. | 318/400.02 |

FOREIGN PATENT DOCUMENTS

| | | |
|---|---|---|
| CN | 101192803 A | 6/2008 |
| CN | 201230202 Y | 4/2009 |
| CN | 101471620 A | 7/2009 |
| CN | 101535913 B | 3/2011 |
| CN | 102374328 A | 3/2012 |
| CN | 102687386 A | 9/2012 |
| JP | H 4-127000 A | 4/1992 |
| JP | 2003-348896 A | 12/2003 |
| JP | 2004-104935 A | 4/2004 |
| JP | 2008-278595 A | 11/2008 |
| WO | WO 2014/048284 A1 | 4/2014 |

OTHER PUBLICATIONS

PCT International Search Report and Written Opinion dated Dec. 12, 2013, issued in International Application No. PCT/CN2013/083977 (9 pages).

Hua Yang, et al.; "The development of large vertical synchronous motor with brushless excitation for the pump station of Jiangsu Province." Public Communication of Science and Technology; May 15, 2012.

* cited by examiner

METHOD FOR CHECKING OUT-OF-STEP OF SYNCHRONOUS MOTOR

CROSS REFERENCE TO RELATED APPLICATIONS

This application claims priority and benefits of Chinese Patent Application No. 201210367126.3, filed with the State Intellectual Property Office, P. R. China on Sep. 27, 2012, the entire contents of which are incorporated herein by reference.

FIELD

The present disclosure relates to a motor control technology field, and more particularly to a method for checking an out-of-step of a synchronous motor.

BACKGROUND

A permanent magnetic synchronous motor (PMSM) can be controlled with a location sensor or without a location sensor. For a control method with the location sensor, a magnetic field location of the synchronous motor is detected by the location sensor, whereas for a control method without the location sensor, a rotor location of the synchronous motor is estimated by a location estimation module. An out-of-step of the synchronous motor is defined with respect to a synchronization, i.e., a rotating magnetic field of a stator does not rotate synchronously with the magnetic field of a rotor magnet. In the PMSM system, reasons such as high system load or reduced motor performance will lead to the out-of-step of the synchronous motor. When the motor is out of step, the rotating speed of the motor is generally uncontrollable, which will cause serious losses and safety risks. Thus, there is a need to check the out-of-step of the synchronous motor precisely and timely.

SUMMARY

Embodiments of the present disclosure seek to solve at least one of the problems existing in the prior art. One objective of the present disclosure is to provide a method for checking an out-of-step of a synchronous motor which can determine whether the synchronous motor is out of step precisely.

According to some embodiments of the present disclosure, a method for checking an out-of-step of a synchronous motor is provided. The method comprises steps of: detecting electric degrees of the synchronous motor, in which the electric degrees comprise at least a first electric degree and a second electric degree detected at a preset interval, and the second electric degree is detected after the first electric degree; comparing the first electric degree with the second electric degree to obtain a comparing result; and determining that the synchronous motor is out of step when the comparing result satisfies a preset requirement.

In one embodiment of the present disclosure, comparing the first electric degree with the second electric degree comprises: subtracting the first electric degree from the second electric degree to obtain a difference value; determining whether the difference value is less than a first preset degree; and if yes, determining that the comparing result satisfies the preset requirement.

The method for checking the out-of-step of the synchronous motor according to some embodiments of the present disclosure calculates the changes of the electric degrees in real time according to the detected electric degrees. According to the fact that the electric degree of the synchronous motor in a normal running forward state should increase progressively, it can be determined that the synchronous motor is out of step when the electric degree keeps unchanged or decreases progressively or when the change of the electric degree is very small, and then protective processes such as turning off waves can be performed to prevent a further damage, thus reducing losses and enhancing safety.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first," "second," and "third" are used herein for purposes of description and are not intended to indicate or imply relative importance or significance.

Unless specified or limited otherwise, the terms "mounted", "connected", "supported", and "coupled" and variations thereof are used broadly and encompass both direct and indirect mountings, connections, supports, and couplings. Further, "connected" and "coupled" are not restricted to physical or mechanical connections or couplings.

In the following, a method for checking an out-of-step of a synchronous motor according to embodiments of the present disclosure is described in detail with reference to drawings.

Figure 1:
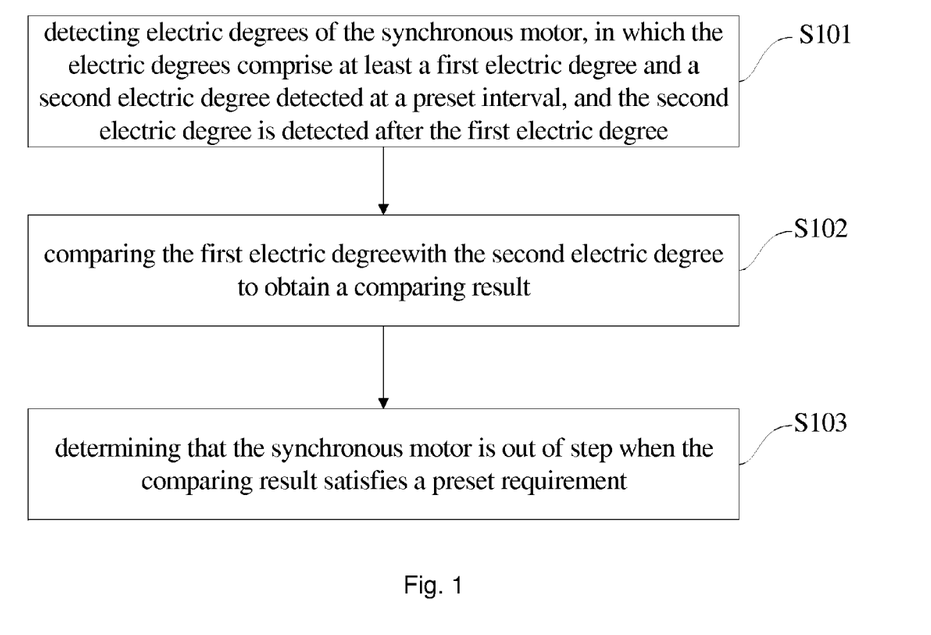
FIG. 1 is a flow chart of a method for checking an out-of-step of a synchronous motor according to an embodiment of the present disclosure.

FIG. 1 is a flow chart of a method for checking an out-of-step of a synchronous motor according to an embodiment of the present disclosure. As shown in FIG. 1, the method comprises the following steps.

At step 101, an electric degree of the synchronous motor is detected. In some embodiments, at least a first electric degree and a second electric degree are detected at a preset interval, and the second electric degree is detected after the first electric degree. In one embodiment of the present disclosure, the preset interval may be but not limited to one program control period in the algorithm which controls when there is no rotor location, i.e., one program period. In other words, the first electric degree is an electric degree in a certain period, and the second electric degree is an electric degree in the next period. The electric degree is detected after the synchronous motor enters in a closed loop control state. For example, it is firstly determined whether the synchronous motor is in a closed loop control state, and if yes, the electric degree used for controlling the synchronous motor is detected. Specifically, the step of detecting the electric degree of the synchronous motor comprises the following steps.

Firstly, a first voltage and a first current on an α axis and a second voltage and a second current on a β axis in a α-β coordinate system are obtained. Specifically, in the control algorithm which controls when there is no rotor location, the first voltage $V_\alpha$ and the first current $I_\alpha$ on the α axis and the second voltage $V_\beta$ and the second current $I_\beta$ on the β axis can be obtained by the PI regulation of the inner current loop and the coordinate transformation.

Secondly, an induced electromotive force is obtained according to the first voltage $V_\alpha$, the first current $I_\alpha$, the second voltage $V_\beta$ and the second current $I_\beta$. For example, the induced electromotive forces $E_\alpha$ and $E_\beta$ are calculated according to the following formula.

$$\begin{cases} V_\alpha = I_\alpha R + L\dfrac{dI_\alpha}{dt} + E_\alpha \\ V_\beta = I_\beta R + L\dfrac{dI_\beta}{dt} + E_\beta \end{cases}$$

Thirdly, an instantaneous angular velocity of the synchronous motor is obtained according to the induced electromotive force and an induced electromotive force constant of the synchronous motor. Specifically, the induced electromotive forces $E_\alpha$ and $E_\beta$ are firstly converted into the induced electromotive forces Ed and Eq, in which the induced electromotive force Ed is the induced electromotive force on d axis and Eq is the induced electromotive force on q axis, and then the induced electromotive force Eq is corrected and then divided by the induced electromotive force constant to obtain the instantaneous angular velocity of the synchronous motor. The correction to the induced electromotive force Eq comprises: when the induced electromotive force Eq is greater than zero, the induced electromotive force Ed is subtracted from the induced electromotive force Eq; when the induced electromotive force Eq is less than zero, the induced electromotive force Ed is added to the induced electromotive force Eq. In one embodiment of the present disclosure, the induced voltage of the stator winding of the synchronous motor rotating under a rated speed is used as the induced electromotive force constant.

Finally, the instantaneous angular velocity is integrated to obtain the electric degree. In other words, after the instantaneous angular velocity is time integrated, the electric degree is obtained.

Each of the first and second electric degrees can be calculated according to the above method.

At step 102, the first electric degree is compared with the second electric degree to obtain a comparing result.

In the control algorithm which controls when there is no rotor location, when the synchronous motor rotates normally, the electric degree should increase progressively and an increment of the electric degree should satisfy a certain requirement. Therefore, it can be determined whether the synchronous motor is out of step by determining whether the second electric degree is greater than the first electric degree or by determining whether a difference value or an increment between the second electric degree and the first electric degree is a positive value. For example, in one embodiment of the present disclosure, the following steps may be executed to determine whether the comparing result satisfies a preset requirement.

Firstly, the first electric degree is subtracted from the second electric degree to obtain the difference value.

Secondly, it is determined whether the difference value is less than a first preset degree. In other words, it is determined whether the electric degree increment in each program period is less than the first preset degree. In a normal condition, the electric degree increment in each program period should be greater than a theoretic minimum variation (i.e., the first preset degree). In one embodiment of the present disclosure, the first preset degree can be obtained from the following formula:

$$\theta = P\omega T,$$

in which θ is the first preset degree, P is a number of electrode pairs of the synchronous motor, ω is a mechanical angular velocity and T is the preset interval.

Finally, it is determined that the comparing result satisfies the preset requirement when the difference value is less than the first preset angle.

Figure 2:
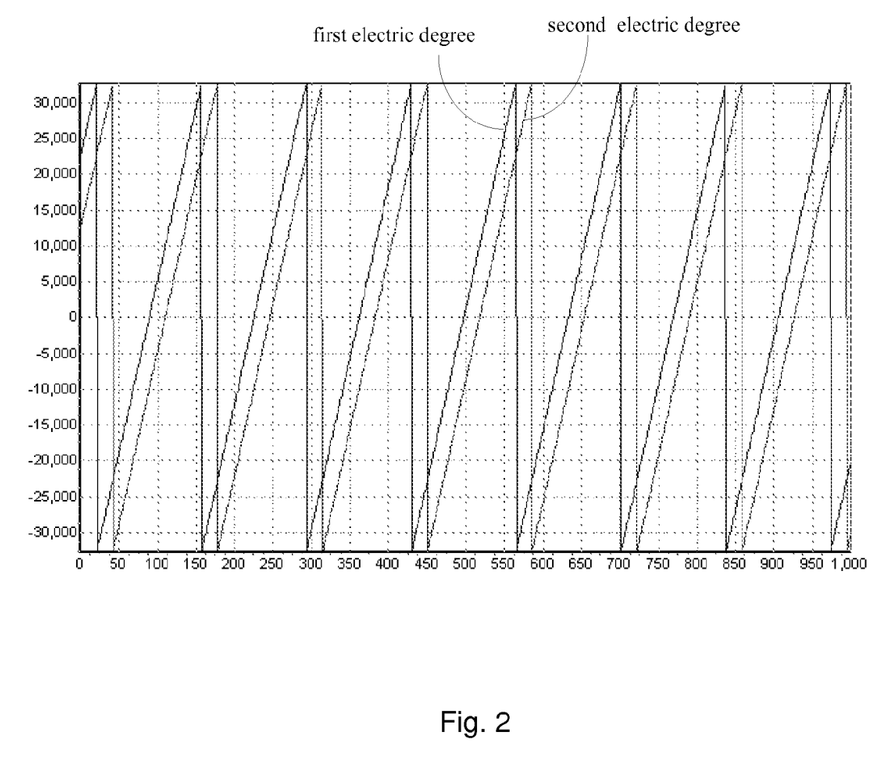
FIG. 2 is a schematic view showing waveforms of a first electric degree and a second electric degree when the synchronous motor rotates normally according to an embodiment of the present disclosure.

FIG. 2 is a schematic view showing waveforms of the first electric degree and the second electric degree when the synchronous motor rotates normally according to an embodiment of the present disclosure. As shown in FIG. 2, when the synchronous motor works normally, the electric degree increases progressively.

At step S103, it is determined that the synchronous motor is out of step when the comparing result satisfies the preset requirement. In other words, when the electric degree increment in each program period is relatively small (for example, less than the first preset angle), it can be determined that the synchronous motor is out of step. In one embodiment of the present disclosure, the above steps may be repeated for many times, i.e., the electric degree in a plurality of continuous program periods (for example, 10 program periods) may be detected, and it is determined that the synchronous motor is out of step only when each electric degree increment between each two adjacent period program periods is less than the first preset angle. Thus, an accuracy of checking the out-of-step is enhanced.

The method for checking the out-of-step of the synchronous motor according to embodiments of the present disclosure calculates the electric degree increment in real time according to the detected electric degrees. According to the fact that the electric degree of the synchronous motor in the normal running forward state increases progressively, it can be determined that the synchronous motor is out of step when the electric degree keeps unchanged or decreases progressively or when the increment of the electric degree is very small, and then a further protective process such as turning off a wave can be performed to prevent a further damage, thus reducing losses and enhancing safety.

The out-of-step of the synchronous motor may be classified into a plurality of types. For example, some types may indicate that there is no rotating magnetic field (i.e., neither the stator field nor the rotor rotates), some types may indicate that the motor rotates reversely (i.e., the rotor of the synchronous motor rotates reversely), and some types may indicate that the rotor of the synchronous motor is locked (i.e., the rotor is locked while the stator field rotates). In light of this, the method according to the present disclosure may also determine a type of the out-of-step of the synchronous motor. Thus, it is convenient to find out the reasons that result in the out-of-step, such that a corresponding process can be performed to avoid a recurrence of a similar out-of-step, thus enhancing the safety and reducing losses.

Specifically, in one embodiment of the present disclosure, the type of the out-of-step of the synchronous motor is determined according to the comparing result. The type of the out-of-step of the synchronous motor comprises a first type of out-of-step and a second type of out-of-step. Hereinafter, the first type of out-of-step indicates that there is no rotating magnetic field, i.e., neither the stator field nor the rotor rotates, and the second type of out-of-step indicates that the motor rotates reversely, i.e., the rotor of the synchronous motor rotates reversely.

More specifically, after determining the difference value is less than the first preset degree, the type of the out-of-step can be determined according to the following steps.

It is firstly determined whether the difference value is greater than or equal to the second preset angle. In one embodiment, the second preset angle may be zero.

When the difference value is greater than or equal to the second preset degree, it is determined that the type of the out-of-step of the synchronous motor is the first type of out-of-step. This is because, when there is no magnetic field (i.e., neither the stator field nor the rotor rotate), an induced electromotive force is calculated to be abnormal according to the current rotor location and load. At this time, a velocity increment is calculated to be zero by an algorithm which estimates the velocity and calculates the angle when there is no rotor location, and an angle increment is also zero or about zero, which results in that the electric degree increment in each program period is very small and greater than or equal to zero. Therefore, when it is determined that the electric degree increment is greater than or equal to zero but less than the minimum variation (i.e. the first preset degree), it can be determined that the out-of-step is caused by the fact that neither the stator field nor the rotor rotates.

When the difference value is less than the second preset degree, it is determined that the type of the out-of-step of the synchronous motor is the second type of out-of-step. As the second preset degree is zero, it can be considered that when the electric degree increment in each program period is a negative value, the second type of out-of-step occurs, specifically, the rotor of the synchronous motor rotates reversely due to load impact or other reasons. When the rotor of the synchronous motor rotates reversely, the calculated electromotive force becomes a negative value, the stepping value of the electric degree estimated in the program becomes a negative value, and the cumulative result of which is that the electric degree decreases progressively. Therefore, when the electric degree increment in each program period is determined to be a negative value, it can be determined that the rotor of the synchronous motor rotates reversely.

Figure 3:
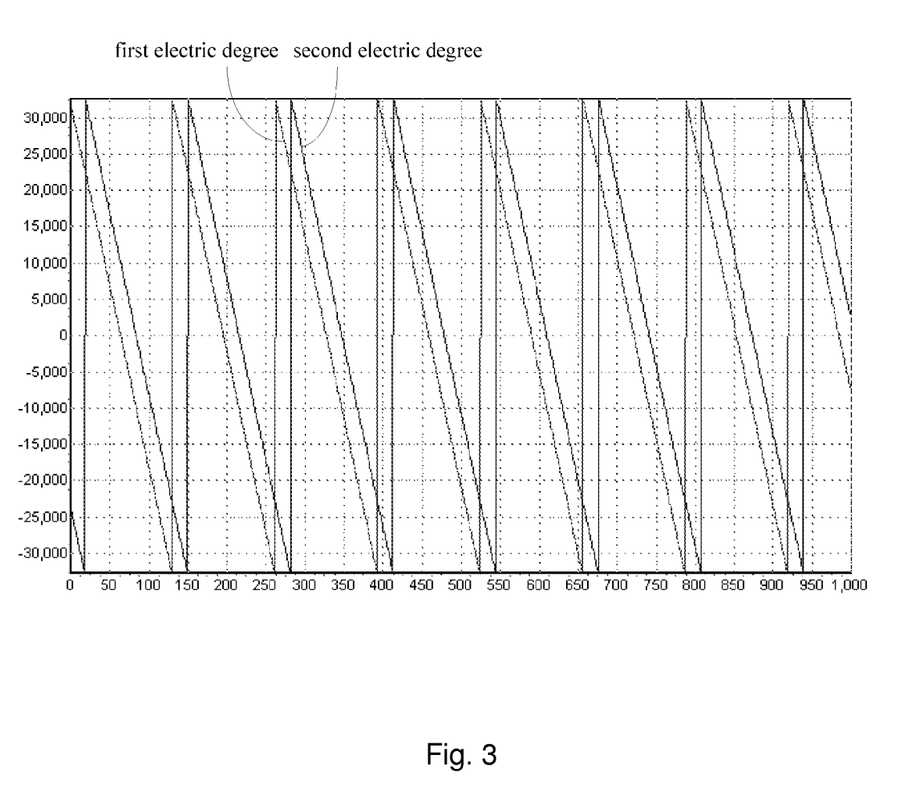
FIG. 3 is a schematic view showing waveforms of a first electric degree and a second electric degree when a second type of out-of-step of the synchronous motor occurs according to an embodiment of the present disclosure.

FIG. 3 is a schematic view showing waveforms of the first electric degree and the second electric degree when the second type of out-of-step occurs to the synchronous motor according to an embodiment of the present disclosure. As shown in FIG. 3, when the second type of out-of-step occurs, the electric degree decreases progressively.

In another embodiment of the present disclosure, the type of the out-of-step of the synchronous motor may also further comprise a third type of out-of-step. In the following, the third type of out-of-step indicates that the rotor of the synchronous motor is locked while the stator field still rotates.

Figure 4:
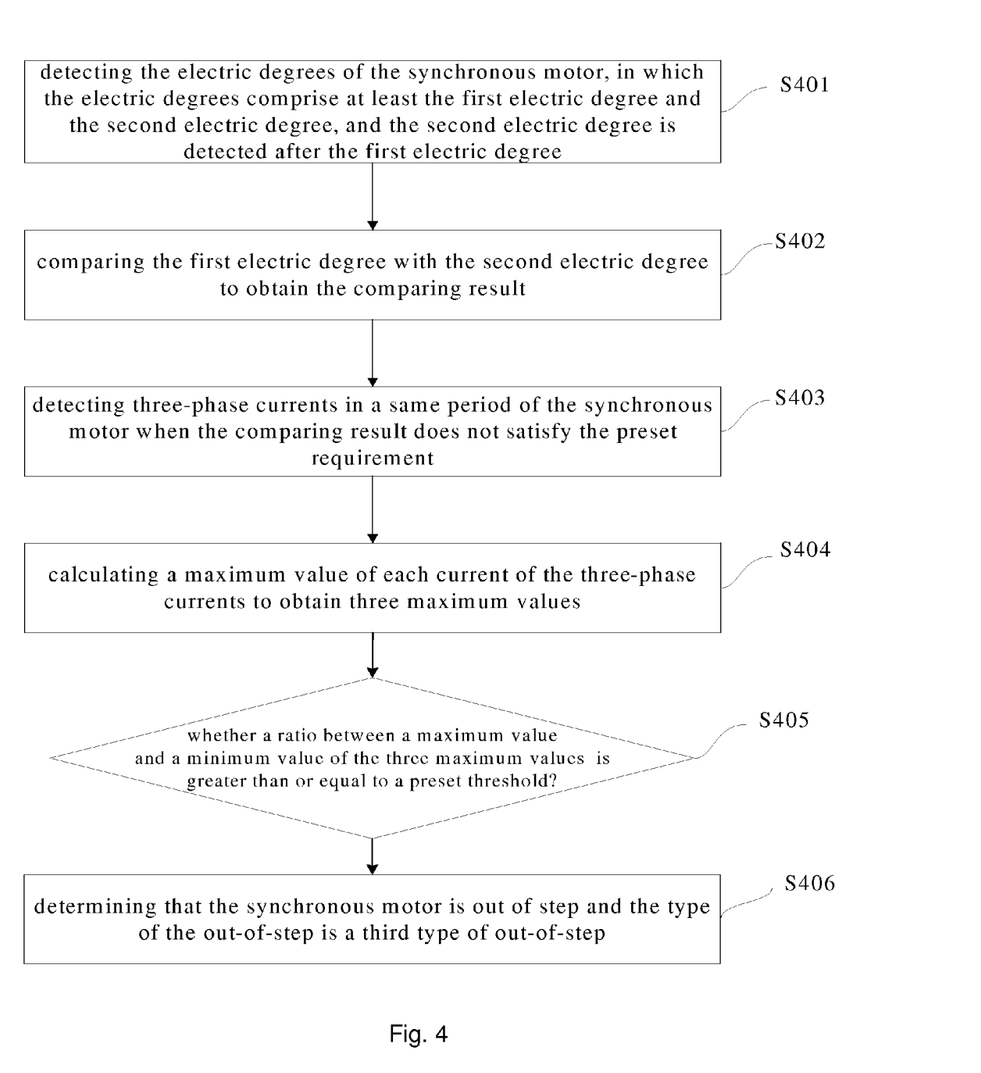
FIG. 4 is a flow chart of a method for checking an out-of-step of a synchronous motor according to another embodiment of the present disclosure.

FIG. 4 is a method for checking an out-of-step of a synchronous motor according to another embodiment of the present disclosure. As shown in FIG. 4, the method comprises the following steps.

At step 401, the electric degree of the synchronous motor is detected, in which the electric degree comprises at least the first electric degree and the second electric degree detected at the preset interval, and the second electric degree is detected after the first electric degree.

At step 402, the first electric degree is compared with the second electric degree to obtain the comparing result.

At step 403, three-phase currents of the synchronous motor in a same period are obtained when the comparing result does not satisfy the preset requirement. In one embodiment, the three-phase currents are detected by a Hall sensor. Specifically, leads of any two phases of the three-phase currents are connected to the Hall sensor. When a current passes through the leads, a voltage signal proportional to the actual current is sensed by the Hall sensor, and then the voltage signal is sampled by a digital signal processor (DSP). Then, the DSP calculates the actual current according to voltage signal and a transform proportion. After obtaining currents of the above any two phases, the current of the third phase can be calculated according to the following formula, $$I_A + I_B + I_C = 0,$$

in which, $I_A$, $I_B$ and $I_C$ represent each current of the three-phase currents respectively.

At step 404, a maximum value of each current of the three-phase currents is calculated to obtain three maximum values. Specifically, absolute values of the three-phase currents in one period are obtained to calculate the maximum value of each current of the three-phase currents. Advantageously, for each current of the three-phase currents, calculation may be performed for many times (such as 5 times) to obtain a plurality of real-time maximum current values, and then a middle value of the plurality of real-time maximum current values is selected to be the maximum value. Thus, the current detection accuracy is enhanced and mistakes can be avoided.

At step 405, it is determined whether a ratio between a maximum value of the three maximum values and a minimum value of the three maximum values is greater than or equal to a preset threshold. Advantageously, in order to further enhance the current detection accuracy, the three maximum values may be obtained for many times, and when the ratio calculated each time is greater than or equal to the preset threshold, it can be determined that the three-phase currents are out of balance, i.e., the synchronous motor is out of step. Specifically, when the motor is locked, the rotor keeps still, the magnetic field of the rotor magnet keeps unchanged, and the magnetic field intensity at the magnetic pole is the largest. If the induced electromotive force on the Q axis still exists at the moment when the rotor stops rotating, the velocity increment and the angle increment of the stator can still be calculated according to the algorithm which estimates the velocity and calculates the angle when there is no rotor location, so that the angle still changes as normal. The angle change makes the composite magnetic field rotate, and the induced electromotive force is generated when the rotating magnetic field cuts the stator winding. According to the formula U=R*I+L*dI/dt+N*BLV, when the voltage U is given, the value of the current I is determined by the magnetic field intensity B. Therefore, when the three-phases stator windings are in different magnetic fields, each current of the three-phase currents is different from each other, thus causing an out-of-balance of the three-phase currents. Thus, when the ratio between a maximum value of the three maximum values and a minimum value of the three maximum values is greater than or equal to the preset threshold, it can be determined that the three-phase currents are out of balance, and the third type of the out-of-step of the synchronous motor occurs. In one embodiment, the preset threshold may be about 1.3.

At step 406, it is determined that the synchronous motor is out of step and the type of out-of-step of the synchronous motor is the third type of out-of-step when the ratio is greater than or equal to the preset threshold.

In conclusion, a relationship between the three-phase currents is calculated in real time according to the values of the three-phase currents. According to the fact that the synchronous motor in a normal running forward state should have the equal amplitude and the 120° phase difference, it can be determined that the synchronous motor is out of step when the three-phase currents are out of balance, and then protective processes can be performed, thus avoiding an occurrence of an accident and reducing losses.

Figure 5:
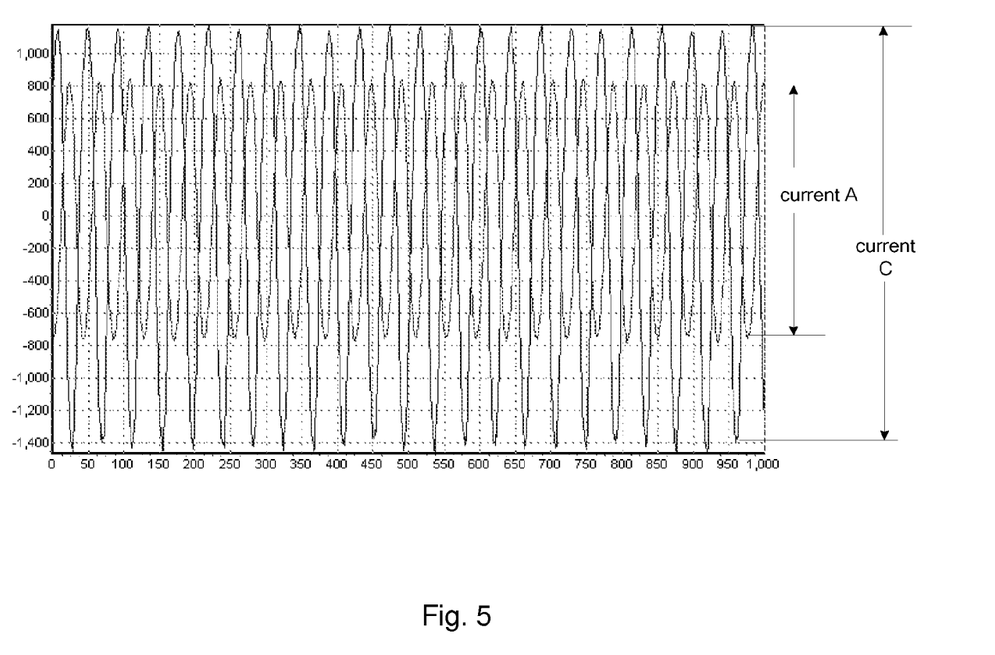
FIG. 5 is a schematic view showing waveforms of the three-phase currents of the synchronous motor when a third type of out-of-step occurs to the synchronous motor according to an embodiment of the present disclosure.

FIG. 5 is a schematic view showing a waveform of the three-phase currents when the third type of out-of-step of the synchronous motor occurs according to an embodiment of the present disclosure. As shown in FIG. 5, only the waveforms of currents A and C are shown, and the waveforms of currents A and C are sine waves. It can be seen from FIG. 3 that the amplitudes of the three-phase currents are different while the phases of the three-phase currents still change as normal when the third type of out-of-step occurs.

Further, when the synchronous motor is out of step (no matter what type of the out-of-step), the wave such as a PWM wave may be turned off to protect the synchronous motor. For example, six PWM waves of the power bridge current are controlled to be turned off. Thus, the synchronous motor is protected, the occurrence of accident is avoided, a further damage is prevented, and a reliability of the synchronous motor is improved.

Those skilled in the art shall appreciate that the embodiments of the invention can be embodied as a method, a system, or a computer program product encoded into a computer readable storage medium. The computer program product can be executed by a processor to perform the method as described in the disclosure.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A computer-implemented method for controlling a synchronous motor, the method comprising:
   transmitting one or more control signals to the synchronous motor;
   determining at least a first electric degree and then a second electric degree, wherein the determination of each of the first and second electric degrees comprises:
      obtaining, from an inner current control loop, data representing a first voltage and a first current on an α axis and a second voltage and a second current on a β axis in a α-β coordinate system,
      determining an induced electromotive force based on the data representing first voltage, the first current, the second voltage, and the second current,
      determining an instantaneous angular velocity of the synchronous motor based on the induced electromotive force and an induced electromotive force constant of the synchronous motor, and
      determining each of the first and second electric degrees based on an integration of the instantaneous angular velocity;
   comparing the first electric degree with the second electric degree to obtain a comparing result;
   determining whether the comparing result satisfies a preset requirement;
   responsive to the determination that the comparing result satisfies the preset requirement, determining that the synchronous motor is out of step;
   determining a type of the out-of-step of the synchronous motor according to the comparing result, wherein the type of the out-of-step comprises a first type of out-of-step indicating that there is no rotating magnetic field and a second type of out-of-step indicating that a rotor of the synchronous motor rotates reversely; and
   disabling a pulse width modulation (PWM) signal to the synchronous motor when the synchronous motor is determined to be out of step.

2. The method according to claim 1, wherein the first electric degree is detected in a first program period, and the second electric degree is detected in a subsequent program period.

3. The method according to claim 1, wherein comparing the first electric degree with the second electric degree comprises:
   determining a difference value between the first electric degree and the second electric degree;
   determining whether the difference value is less than a first preset degree; and
   responsive to the determination that the difference value is less than the first preset degree, determining that the comparing result satisfies the preset requirement.

4. The method according to claim 1, further comprising:
determining whether the difference value is less than a second preset degree;
responsive to the determination that the difference value is not less than the second preset degree, determining the type of the out-of-step of the synchronous motor is the first type of out-of-step; and
responsive to the determination that the difference value is less than the second preset degree, determining that the type of the out-of-step of the synchronous motor is the second type of out-of-step.

5. The method according to claim 3, wherein the first preset degree is obtained from a formula θ=PωT and the second preset degree is zero, in which θ is the first preset degree, P is a number of electrode pairs of the synchronous motor, ω is a mechanical angular velocity and T is the preset interval.

6. The method according to claim 1, wherein the type of the out-of-step of the synchronous motor further comprises a third type of out-of-step.

7. The method according to claim 6, further comprising:
responsive to determining that the comparing result does not satisfy the preset requirement, detecting, with a sensor, three-phase currents of the synchronous motor in a same period;
calculating a maximum value of each of the three-phase currents to obtain three maximum values;
determining a ratio between a maximum value of the three maximum values and a minimum value of the three maximum values;
responsive to the determination that the ratio is greater than or equal to a preset threshold, determining that the synchronous motor is out of step, and that the type of out-of-step of the synchronous motor is the third type of out-of-step.

8. The method according to claim 6, wherein the third type of out-of-step indicates that the rotor of the synchronous motor is locked.

9. The method according to claim 7, wherein the three-phase currents of the synchronous motor are obtained by a Hall sensor.

10. The method according to claim 1, further comprising:
determining whether the synchronous motor is in a closed loop control phase; and
responsive to the determination that the synchronous motor is in a closed loop control phrase, determining the at least first and second electric degrees of the synchronous motor.

11. A non-transitory computer readable storage medium comprising computer program codes that are executable, by a hardware processor to cause the hardware processor to perform a method for controlling a synchronous motor, wherein the method comprises:
transmitting one or more control signals to the synchronous motor;
determining at least a first electric degree and then a second electric degree, wherein the determination of each of the first and second electric degrees comprises:
obtaining, from an inner current control loop, data representing a first voltage and a first current on an α axis and a second voltage and a second current on a β axis in a α-β coordinate system,
determining an induced electromotive force based on the data representing first voltage, the first current, the second voltage, and the second current,
determining an instantaneous angular velocity of the synchronous motor based on the induced electromotive force and an induced electromotive force constant of the synchronous motor, and
determining each of the first and second electric degrees based on an integration of the instantaneous angular velocity;
comparing the first electric degree with the second electric degree to obtain a comparing result;
determining whether the comparing result satisfies a preset requirement;
responsive to the determination that the comparing result satisfy the preset requirement, determining that the synchronous motor is out of step;
determining a type of the out-of-step of the synchronous motor according to the comparing result, wherein the type of the out-of-step comprises a first type of out-of-step indicating that there is no rotating magnetic field and a second type of out-of-step indicating that a rotor of the synchronous motor rotates reversely; and
disabling a pulse width modulation (PWM) signal to the synchronous motor when the synchronous motor is determined to be out of step.

12. The non-transitory computer readable storage medium of claim 11, wherein first electric degree is detected in a first program period, and the second electric degree is detected in a subsequent program period.

13. The non-transitory computer readable storage medium of claim 11, wherein comparing the first electric degree with the second electric degree comprises:
determining a difference value between the first electric degree from the second electric degree;
determining whether the difference value is less than a first preset degree; and
responsive to the determination that the difference value is less than the first preset degree, determining that the comparing result satisfies the preset requirement.

14. The non-transitory computer readable storage medium of claim 11, further comprising computer codes executable by the hardware processor to cause the hardware processor to further perform:
determining whether the synchronous motor is in a closed loop control phase; and
responsive to the determination that the synchronous motor is in a closed loop control phase, determining the at least first and second electric degrees of the synchronous motor.

15. A system for controlling a synchronous motor, comprising:
a memory that stores a set of instructions; and
a hardware processor configured to execute the set of instructions to perform:
transmitting one or more control signals to the synchronous motor;
determining at least a first electric degree and then a second electric degree, wherein the determination of each of the first and second electric degrees comprises:
obtaining, from an inner current control loop, data representing a first voltage and a first current on an α axis and a second voltage and a second current on a β axis in a α-β coordinate system,
determining an induced electromotive force based on the data representing first voltage, the first current, the second voltage, and the second current,
determining an instantaneous angular velocity of the synchronous motor based on the induced electromotive force and an induced electromotive force constant of the synchronous motor, and determining each of the first and second electric degrees based on an integration of the instantaneous angular velocity;

comparing the first electric degree with the second electric degree to obtain a comparing result;

determining whether the comparing result satisfies a preset requirement;

responsive to the determination that the comparing result satisfies the preset requirement, determining that the synchronous motor is out of step;

determining a type of the out-of-step of the synchronous motor according to the comparing result, wherein the type of the out-of-step comprises a first type of out-of-step indicating that there is no rotating magnetic field and a second type of out-of-step indicating that a rotor of the synchronous motor rotates reversely; and disabling a pulse width modulation (PWM) signal to the synchronous motor when the synchronous motor is determined to be out of step.

16. The method of claim 1, wherein the PWM signal is transmitted to the synchronous motor via a power bridge circuit.

\* \* \* \* \*